(12) United States Patent
Vanderslik

(10) Patent No.: US 7,585,081 B2
(45) Date of Patent: Sep. 8, 2009

(54) EXTENDABLE MIRRORS FOR VEHICLE HANDLEBARS

(76) Inventor: John Henry Vanderslik, 4856 Hirsch Rd., Mariposa, CA (US) 95338

(*) Notice: Subject to any disclaimer, the term of this patent is extended or adjusted under 35 U.S.C. 154(b) by 0 days.

(21) Appl. No.: 12/193,757

(22) Filed: Aug. 19, 2008

(65) Prior Publication Data
US 2009/0067073 A1 Mar. 12, 2009

Related U.S. Application Data

(60) Provisional application No. 60/971,499, filed on Sep. 11, 2007.

(51) Int. Cl.
*B60R 1/06* (2006.01)
(52) U.S. Cl. .................. 359/842; 248/481
(58) Field of Classification Search .......... 359/842, 359/871; 248/479–483; 403/57, 76, 77
See application file for complete search history.

(56) References Cited

U.S. PATENT DOCUMENTS

| | | | | |
|---|---|---|---|---|
| 4,252,290 A * | 2/1981 | Willey | ........................ | 248/549 |
| 4,445,228 A * | 4/1984 | Bruni | ........................ | 381/302 |
| 4,991,814 A * | 2/1991 | Schmidt et al. | ............. | 248/479 |
| 6,491,402 B1 * | 12/2002 | Stenzel | ........................ | 359/871 |
| 6,764,056 B1 * | 7/2004 | Wu | ........................ | 248/480 |
| 2002/0067557 A1 * | 6/2002 | Coleburn | .................... | 359/842 |
| 2005/0237643 A1 * | 10/2005 | Wu | ........................ | 359/871 |

FOREIGN PATENT DOCUMENTS

| | | | |
|---|---|---|---|
| CN | 201086780 Y | * | 7/2008 |
| CN | 201148185 Y | * | 11/2008 |
| DE | 2325382 A | * | 3/1976 |

* cited by examiner

*Primary Examiner*—Alessandro Amari
*Assistant Examiner*—Mark Consilvio
(74) *Attorney, Agent, or Firm*—Richard A. Ryan; Donald W. Meeker

(57) ABSTRACT

A fully adjustable mirror is attached to a housing having a ball and socket mount modified to allow the mirror support shaft to pass through. A collet with a knurled locking collar slides and locks at any desired point along the length of a straight mirror receiving shaft. The shaft is drilled and threaded to accept an end piece if a proper end is not cast as part of shaft to fit a desired mirror mount on the handlebars or bodywork of a vehicle.

11 Claims, 3 Drawing Sheets

EXTENDABLE MIRRORS FOR VEHICLE HANDLEBARS

CROSS-REFERENCE TO RELATED APPLICATIONS

The present utility patent application claims the benefit of provisional application No. 60/971,499 filed Sep. 11, 2007.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to motorcycle mirrors and particularly to an extendable motorcycle mirror which can be extended and retracted without the use of tools by a hand turned tightening adjustment device on a sliding shaft, wherein the extendable motorcycle mirror can be fit to any of a variety of existing mirror bases on motorcycles.

2. Description of Related Art Including Information Disclosed Under 37 CFR 1.97 and 1.98

In various conditions of motorcycle riding, it is desirable to adjust the amount of extension of the rear view mirror or mirrors. This is especially true if there is a passenger or items carried on the back of the vehicle which block the view unless the mirror is extended out further.

Prior art patents do not adequately address the problem of providing an extendable mirror for vehicles with handlebars which is easily adjusted without the use of tools and allows full adjustment of the mirror. Related prior art patents and published patent applications include: D406,088 by Hanlon et al, US2003/0168572A1 by Scheuble et al, US2004/0135054A1 by De Leon, U.S. Pat. No. 2,713,810 by Hill, U.S. Pat. No. 5,489,080 by Allen, U.S. Pat. No. 6,139,159 by Whitehead, U.S. Pat. No. 6,036,160 by Shimokobe et al, U.S. Pat. No. 6,485,151 by Coleburn, U.S. Pat. No. 6,764,056 by Wu, U.S. Pat. No. 6,779,772 by De Leon, and Japanese Patent Document No. 2006-069299 on March 2006.

What is needed is an extendable mirror for vehicles with handlebars which is easily adjusted without the use of tools and allows full adjustment of the mirror.

BRIEF SUMMARY OF THE INVENTION

An object of the present invention is to provide an extendable mirror for vehicles with handlebars which is easily adjusted without the use of tools and allows full adjustment of the mirror.

Another object of the present invention is to provide different ends for mounting to various motorcycles with a threaded stud or proper end cast into the shaft.

In brief, the mirror assembly of the present invention comprises a fully adjustable mirror attached to a housing having a ball and socket mount modified to allow the mirror support shaft to pass through, and a collet with a knurled locking collar that slides and locks at any desired point along the length of the straight mirror receiving shaft. The shaft is approximately seven inches long, drilled and threaded to accept the end piece if proper end is not cast as part of shaft to fit a desired mirror mount on the handlebars or bodywork of a vehicle.

The proper end for the motorcycle or other vehicle having handlebars to be fitted is screwed into the shaft/mirror assembly or integral to the shaft. The mirror can be extended axially in any increment until contacting the stop inside the mirror housing to prevent the mirror from leaving the shaft. The desired adjustment can then be locked down with the knurled collar acting upon the collet which has a nylon/plastic sleeve to avoid marring the finish on the shaft.

An advantage of the present invention is that it permits the motorcycle operator to extend the rearview mirrors outward axially to improve rearward vision or to retract the mirrors to their original position without tools or loose parts.

BRIEF DESCRIPTION OF THE SEVERAL VIEWS OF THE DRAWINGS

These and other details of the present invention will be described in connection with the accompanying drawings, which are furnished only by way of illustration and not in limitation of the invention, and in which drawings.

Figure 1:
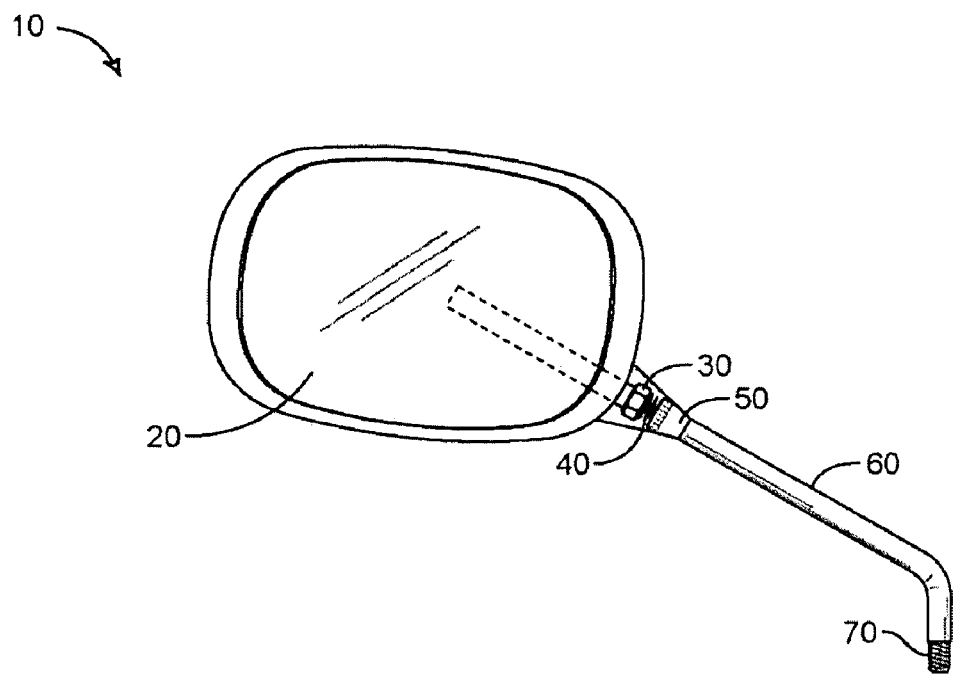
FIG. 1 is a perspective view of an extendable mirror for motorcycles of the present invention shown in an un-extended position.
Figure 2:
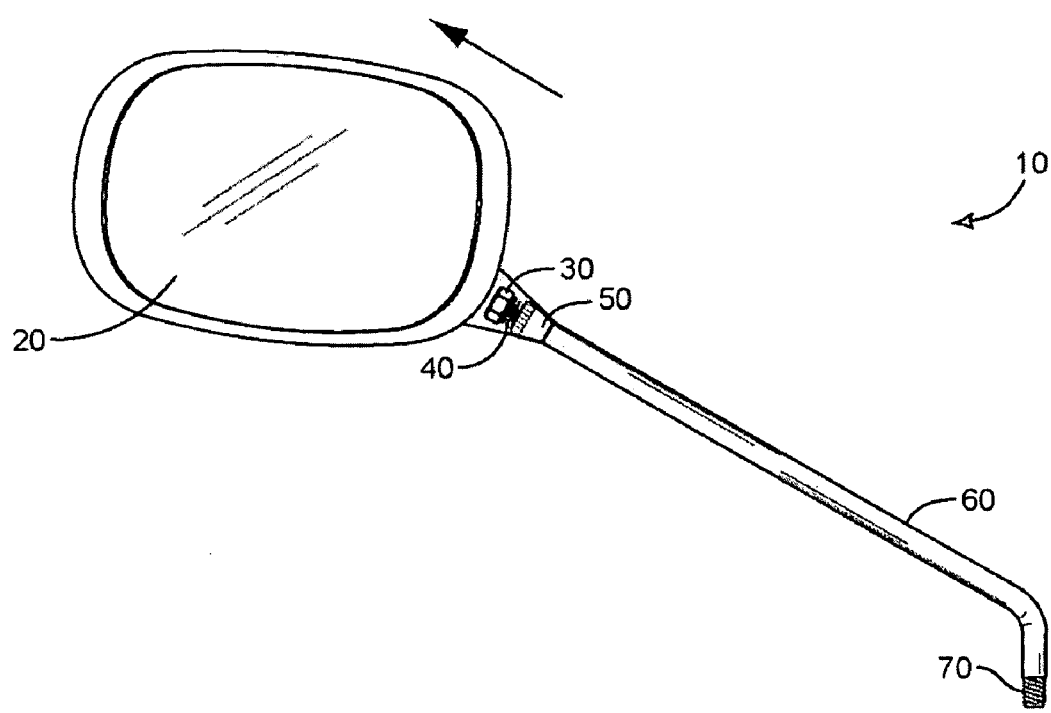
FIG. 2 is a perspective view of the extendable mirror for motorcycles of FIG. 1 shown in an extended position.

Number Description List for the Parts of the Present Invention:

10 is the extendable mirror for motorcycles of the present invention.
20 is a mirror component of the extendable mirror for motorcycles of the present invention.
30 is a nut.
40 is a spring.
50 is a threaded knurled locking cone that engages and locks collet.
55 collet.
60 is a mirror receiving shaft.
65 cone locking assembly for the collet.
70 is an interchangeable end.
80 is a motorcycle.

DETAILED DESCRIPTION OF THE INVENTION

In FIGS. 1-5, an extendable rearview mirror device 10 for vehicles having handlebars comprises a mirror receiving shaft 60 which receives a mirror 20 with an adjustable securing assembly 65 for locking the mirror in place at any desired point along the length of the mirror receiving shaft 60 which is mounted on a handlebar or bodywork of any vehicle by attaching an end piece adapter to the threaded end 70 of the shaft or having proper end cast integrally with the shaft.

The elongated rigid mirror mounting shaft 60 comprises a proximal end attaching portion comprising a substantially vertical rigid attaching shaft having a threaded or cast end 70 as a means for connecting the mirror mounting shaft to a mirror receiving mount on a handlebar or bodywork of a vehicle or to an end piece to adapt the shaft to fit a desired mirror mount. A longer straight mirror receiving shaft 60 at a distal end and comprising most of the mirror mounting shaft is contiguous with the rigid attaching shaft and angled upwardly therefrom for receiving the rearview mirror 20 slidably attached thereon so that the mirror is adjustably positioned at any desired location along the length of the mirror mounting shaft 60.

Figure 4:
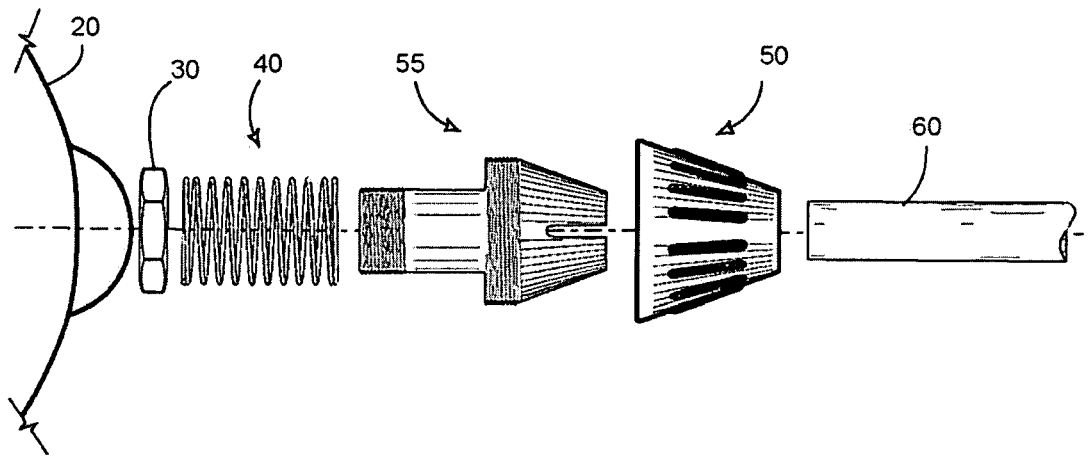
FIG. 4 is an exploded side elevational view of a collet securing assembly for adjusting the extension length of the extendable mirror for motorcycles of FIG. 1.
Figure 5:
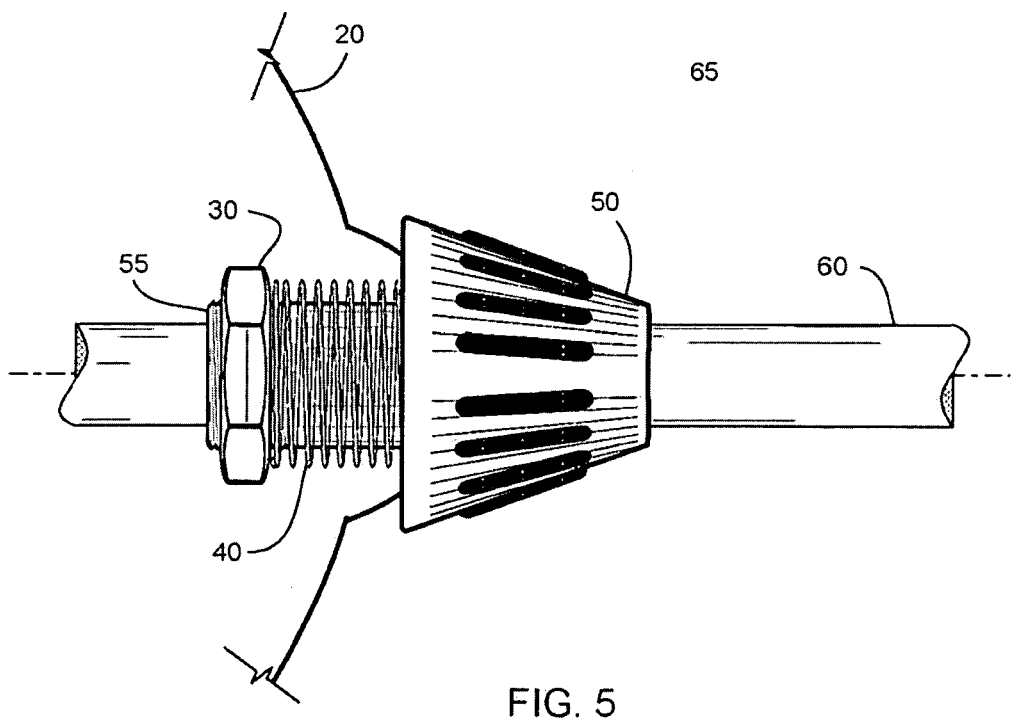
FIG. 5 is a side elevational view of the assembled collet assembly of the extendable mirror for motorcycles of FIG. 1.

The rearview mirror assembly 20 comprises a reflective surface in a mirror frame to enable a driver of the vehicle to see behind the vehicle and a mirror mount assembly 65, as shown in FIGS. 4 and 5. A ball and socket mount on the mirror mount shown as 20 is modified with an opening therethrough to allow the mirror receiving shaft 60 to pass through the ball and socket mount while still allowing pivotal adjustment of the reflective surface. The ball socket on said mirror housing can be either concave or convex in design. A collet 55 is slidably mounted on the mirror receiving shaft 60. The collet 55 comprises means for engaging the ball and socket mount to allow rotation of the ball and socket mount to adjust the reflective surface. A distal hollow cylindrical portion has a first threaded portion at a distal end. A stepped portion has a larger diameter than the cylindrical portion, the stepped portion having a larger diameter second threaded portion adjacent to the cylindrical portion and a split truncated conical portion tapering from the larger diameter second threaded portion to a proximal end. A knurled locking collar 50 is slidably mounted on the mirror receiving shaft 60 adjacent to the split truncated conical portion of the collet 55. The knurled locking collar 50 comprises a truncated conical external surface bearing surface knurls for gripping by hand and an internal distal threaded portion to mate with the second threaded portion of the collet 55 and an internal tapered truncated conical surface to engage the split truncated conical surface of the collet so that threading the knurled locking collar onto the collet binds the collet against the mirror receiving shaft to lock the rearview mirror assembly at a desired point along the mirror receiving shaft thereby forming an extendable rearview mirror device 10 for vehicles having handlebars.

The means for engaging the ball and socket mount comprises a coil compression spring 40 encircling the distal hollow cylindrical end of the collet 55 and a threaded nut 30 engaging the first threaded portion of the collet so that the compression spring presses the ball and socket mount of the mirror assembly 20 against the stepped portion of the collet 55 to retain the ball and socket mount while allowing rotation of the ball and socket mount.

The collet preferably further comprises a synthetic sleeve of nylon or plastic to avoid marring the finish on the shaft or the collet portion is cast in plastic in its' entirety.

Figure 3:
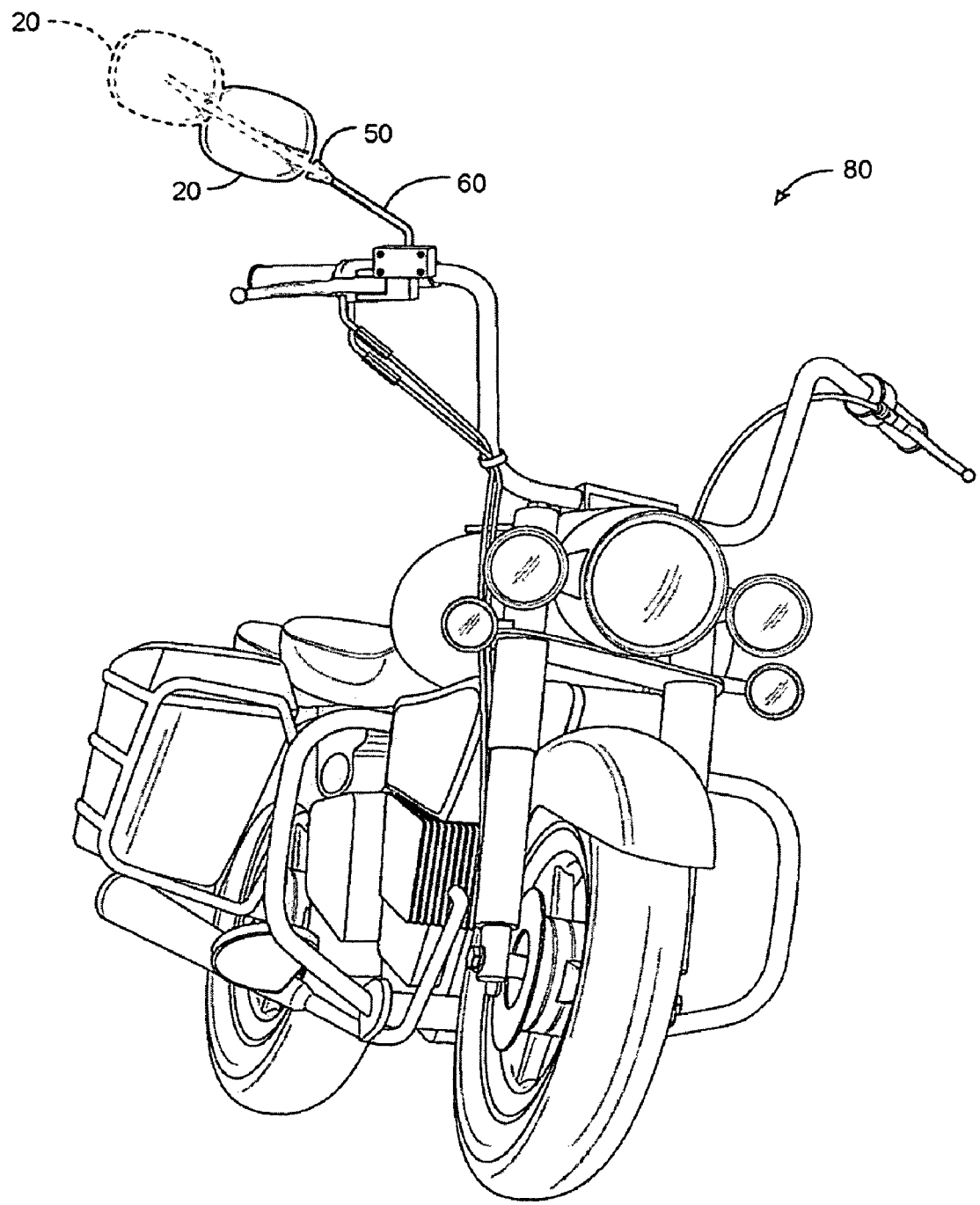
FIG. 3 is a perspective view of the extendable mirror for motorcycles of FIG. 1 in use on a motorcycle.

The means for connecting the mirror mounting shaft to a mirror receiving mount on a handlebar or bodywork of a vehicle comprises a means for connecting the mirror mounting shaft to any of a variety of vehicles having handlebars taken from the list of vehicles having handlebars including a motorcycle, as shown in FIG. 3, a scooter, a motorbike, an all terrain vehicle, a snowmobile, a jet ski, a bicycle, and a tricycle.

In use, the extendable rearview mirror device 10 for vehicles having handlebars is mounted directly onto a mirror mount on the handlebars or bodywork of a vehicle or uses an end piece adaptor to attach to the mirror mount. The knurled locking collar 50 is unscrewed to unlock the collet 55 and slide the mirror assembly to a desired location on the mirror receiving shaft 60 for the best use of the rearview mirror 20. The knurled locking collar 50 is screwed down tight onto the collet to lock the mirror mount in place.

It is understood that the preceding description is given merely by way of illustration and not in limitation of the invention and that various modifications may be made thereto without departing from the spirit of the invention as claimed.

What is claimed is:

1. An extendable rearview mirror device for vehicles having handlebars, the device comprising:

an elongated rigid mirror mounting shaft comprising a proximal end attaching portion comprising a substantially vertical rigid attaching shaft having a means for connecting the mirror mounting shaft to a mirror receiving mount on a handlebar and bodywork of a vehicle, and a longer straight mirror receiving shaft at a distal end contiguous with the rigid attaching shaft and angled upwardly therefrom for receiving a rearview mirror slidably attached thereon so that the mirror is adjustably positioned at any desired location along the length of the mirror mounting shaft;

a rearview mirror assembly comprising a reflective surface in a mirror frame to enable a driver of the vehicle to see behind the vehicle and a mirror mount assembly comprising an external housing; a ball and socket mount modified to allow the mirror receiving shaft to pass through the ball and socket mount while still allowing pivotal adjustment of the reflective surface; a collet slidably mounted on the mirror receiving shaft, the collet comprising means for engaging the ball and socket mount to allow rotation of the ball and socket mount to adjust the reflective surface, a distal hollow cylindrical portion with a first threaded portion at a distal end, and a stepped portion having a larger diameter than the cylindrical portion, the stepped portion having a larger diameter second threaded portion adjacent to the cylindrical portion and a split truncated conical portion tapering from the larger diameter second threaded portion to a proximal end; a knurled locking collar slidably mounted on the mirror receiving shaft adjacent to the split truncated conical portion of the collet, the knurled locking collar comprising a truncated conical external surface bearing surface knurls for gripping by hand and an internal distal threaded portion to mate with the second threaded portion of the collet and an internal tapered truncated conical surface to engage the split truncated conical surface of the collet so that threading the knurled locking collar onto the collet binds the collet against the mirror receiving shaft to lock the rearview mirror assembly at a desired point along the mirror receiving shaft thereby forming an extendable rearview mirror device for vehicles having handlebars.

2. The device of claim 1 wherein the means for engaging the ball and socket mount comprises a coil compression spring encircling the distal hollow cylindrical end of the collet and a threaded nut engaging the first threaded portion of the collet so that the compression spring presses the ball and socket mount against the stepped portion of the collet to retain the ball and socket mount while allowing rotation of the ball and socket mount.

3. The device of claim 1 wherein the collet further comprises a synthetic sleeve to avoid marring the finish on the shaft.

4. The device of claim 3 wherein the synthetic sleeve comprises a nylon sleeve.

5. The device of claim 3 wherein the synthetic sleeve comprises a plastic sleeve.

6. The device of claim 3 wherein the collet is made entirely of plastic.

7. The device of claim 3 wherein the collet is made entirely of nylon.

8. The device of claim 1 wherein the means for connecting the mirror mounting shaft to a mirror receiving mount on a handlebar and bodywork of a vehicle comprises a threaded end to mate with a variety of mirror receiving mounts.

9. The device of claim 1 wherein the means for connecting the mirror mounting shaft to a mirror receiving mount on a handlebar and bodywork of a vehicle comprises an interchangeable end piece attached to the attaching shaft to mate with any of a variety of mirror receiving mounts.

10. The device of claim 1 wherein the proper end for mounting the shaft to the handlebar and bodywork of a vehicle is cast integrally with the shaft.

11. The device of claim 1 wherein the means for connecting the mirror mounting shaft to a mirror receiving mount on a handlebar and bodywork of a vehicle comprises a means for connecting the mirror mounting shaft to any of a variety of vehicles having handlebars taken from the list of vehicles having handlebars including a motorcycle, a scooter, a motorbike, an all terrain vehicle, a snowmobile, a jet ski, a bicycle, and a tricycle.

* * * * *